United States Patent [19]

Ausnit et al.

[11] Patent Number: 4,807,300
[45] Date of Patent: * Feb. 21, 1989

[54] PLASTIC ZIPPER BAG WITH ANCHOR-SOCKET ATTACHMENT ARRANGEMENT

[75] Inventors: Steven Ausnit, New York; Per Bentsen, Suffern, both of N.Y.

[73] Assignee: Minigrip, Inc., Orangeburg, N.Y.

[*] Notice: The portion of the term of this patent subsequent to Jul. 21, 2004 has been disclaimed.

[21] Appl. No.: 72,559

[22] Filed: Jul. 13, 1987

Related U.S. Application Data

[63] Continuation-in-part of Ser. No. 769,894, Aug. 27, 1985, Pat. No. 4,682,366.

[51] Int. Cl.[4] ............................................. B65D 33/16
[52] U.S. Cl. ............................. 383/65; 24/576; 24/587; 156/66; 383/35; 383/95; 493/214; 493/390
[58] Field of Search ............ 383/35, 63, 64, 65, 383/95–97, 62, 87, 98, 99, 81, 86, 84; 206/632, 633; 24/576, 587; 493/213, 214, 927, 390; 156/66

[56] References Cited

U.S. PATENT DOCUMENTS

| Re, 28,969 | 9/1976 | Naito . | |
|---|---|---|---|
| 2,056,856 | 10/1936 | Hora . | |
| 2,378,503 | 6/1945 | Rohdin | 383/35 |
| 2,542,245 | 2/1951 | Gottesman . | |
| 2,701,222 | 2/1955 | Hetzel et al. . | |
| 2,791,807 | 5/1957 | Morin . | |
| 2,821,764 | 2/1958 | Leahy et al. . | |
| 2,914,936 | 12/1959 | Reinold . | |
| 2,997,166 | 8/1961 | Pratt | 206/633 X |
| 3,119,549 | 1/1964 | Schoen | 206/632 X |
| 3,164,186 | 1/1965 | Weber et al. | 383/63 X |
| 3,346,883 | 10/1967 | Erseli | 383/63 X |
| 3,462,803 | 8/1969 | Horton . | |
| 3,827,472 | 8/1974 | Uramoto | 383/63 X |
| 4,341,575 | 7/1982 | Herz . | |
| 4,430,070 | 2/1984 | Ausnit . | |
| 4,532,166 | 7/1985 | Thomsen et al. . | |
| 4,682,366 | 7/1987 | Ausnit et al. | 383/65 |
| 4,756,628 | 7/1988 | Branson | 383/63 |

FOREIGN PATENT DOCUMENTS

| 90167 | 12/1960 | Denmark . |
|---|---|---|
| 97451 | 12/1961 | France . |
| 477004 | 1/1953 | Italy . |
| 98822 | 10/1961 | Norway . |
| 312954 | 4/1956 | Sweden . |

Primary Examiner—Stephen Marcus
Assistant Examiner—Bryon Gehman

[57] ABSTRACT

A bag structure especially adapted to be made from bag body web material, and fusibly incompatible extruded plastic zipper, comprises a pair of zipper strips having reclosable zipper profiles located below upper ends of pull flanges. Fused connecting anchors extend from the zipper strips through holes in the material of the bag body material and thereby permanently attach the zipper strips to the bag body material. Anchorage of the bag body material may be in groove sockets provided by the zipper strips. The zipper strips may be located on the inside or the outside of the bag structure. A pilfer evident seal may be provided along the pull flanges and require destruction of the seal to gain access into the bag through the reclosable zipper. Method of making the bag structure is also disclosed.

25 Claims, 5 Drawing Sheets

PLASTIC ZIPPER BAG WITH ANCHOR-SOCKET ATTACHMENT ARRANGEMENT

The present application is a continuation-in-part of our copending application, Ser. No. 769,894 filed Aug. 27, 1985, now U.S. Pat. No. 4,682,366 dated July 24, 1987.

BACKGROUND OF THE INVENTION

This invention relates to the art of bag making, and is more particularly concerned with bags having reclosable zippers of the extruded complementary rib and groove type.

Heretofore, numerous and varied bag structures of this type have been proposed and some have achieved substantial commercial success.

For example, U.S. Pat. No. Re. 28,969 discloses a bag structure in which the bag body web and the zipper profiles are extruded in one piece and the bag has pulled flanges which project outwardly relative to the zipper.

In U.S. Pat. No. 4,430,070 the zipper is fusibly attached to the bag wall web spaced inwardly from the pull flanges which project outwardly from the zipper.

Both of these examples require that the bag body web and the zipper profiles be fusibly compatible, that is that one can be fused onto the other by some sort of heat sealing means.

On the other hand, U.S. Pat. No. 4,341,575 is representative of disclosures wherein zipper strips are attached to the bag wall web by adhesive means, and which would permit fusibly incompatible materials to be used. However, it will be noted that this disclosure requires fairly critical parameters in the adhesive attachment to avoid separation of the elements. Adhesive attachment generally involves some messiness due to the necessary manner of application of the adhesive to the elements.

Fused attachment of the elements is generally perferred, but presents a problem where the zipper strips and the bag body web are fusibly incompatible. For example, while polypropylene may be fused to polypropylene, and polyethylene may be fused to polyethylene, there is great difficulty encountered in any attempt to fuse or heat seal polyethylene to polypropylene. In bags, while polyethylene is widely used, both for the bag body web material and also for the profiled zipper strips, for one thing because of the ease of extruding such material, the polyethylene material does not afford the imperviousness that is frequently desired where fluid barrier is required. Sometimes, also, other web material incompatible to fusing together with polyethylene may be desired, while the profiled zipper strips should be extruded from polyethylene.

It is to the problem of making bags from fusibly incompatible bag body web material and extruded plastic profile zipper strips that the present invention is directed.

In the prior art, there has been the suggestion in U.S. Pat. No. 2,791,807 that separable fasteners with stringers be constructed of extruded plastic profile fasteners attached to fabric stringer tapes so that the plastic strips may be attached by sewing the fabric tape stringers to the articles to which the fastener strips are desired to be secured. The structure in that patented disclosure does not lend itself to embodiment in bags, and more particularily bags made from plastic wall web material, and provided with pull flanges at their open tops.

SUMMARY OF THE INVENTION

It is, accordingly, an important object of the present invention to provide a new and improved bag structure made from fusibly incompatible bag wall web material and extruded plastic zipper and in which the bags are provided with pull flanges.

Another object of the invention is to provide bag structure as just indicated in which the fusibly incompatible bag wall web material and the extruded zipper are secured together by fusibly locking parts of the zipper to one another for securing the zipper to the bag wall web.

Accordingly, the present invention provides a bag having a thin web material body with an openable top flanked by opposed upwardly projecting pull flanges and extruded plastic zipper means carried by said body along said pull flanges, and wherein, said bag body and said zipper means are fusibly incompatible, said zipper means comprising a pair of strips having complementary separably interlockable zipper profiles located substantially below upper ends of said pull flanges, holes in said bag body material, and fused connecting anchors extending from said zipper strips through said holes and permanently attaching said zipper strips to said bag body.

A new and improved method is provided for making the bag structure assembly of the fusibly incompatible materials.

BRIEF DESCRIPTION OF THE DRAWINGS

Other objects, features and advantages of the invention will be readily apparent from the following description of representative embodiments thereof, taken in conjunction with the accompanying drawings, although variations and modifications may be effected without departing from the spirit and scope of the novel concepts embodied in the disclosure and in which.

DETAILED DESCRIPTION

Throughout the description, it will be understood that various parts of the structure may, for illustrative purposes, be dimensionally exaggerated and that, as a matter of fact, cross sectional dimensions as well as some other dimensions may in actual practice be on a much smaller scale. Dimensions may vary, as is well known in this art, depending upon strength factors required, uses to which the ultimate bags may be put, etc.

Figure 1:
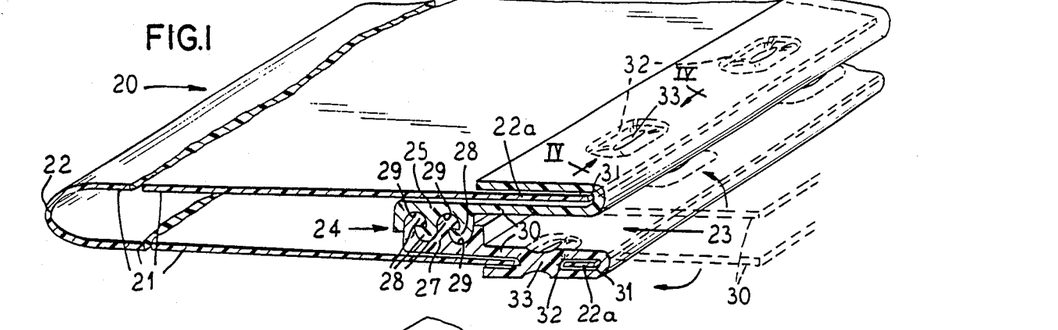
FIG. 1 is a fragmental perspective view showing bag making material embodying the present invention.

Referring to FIG. 1, a bag structure 20 is shown as though just completed in a continuous ribbon and before cross sealing and separating into individual bag sections. The structure 20 comprises a bag wall web 21 folded upon itself to provide a closed bag bottom 22 and having upper end margins 22a providing pull flanges between which is defined a bag mouth top opening 23. Alternately if an open bottom bag is desired, two separate bag walls can be used instead of one folded wall.

A reclosable zipper 24 is secured to the bag wall web 21 at the margins 22a. In a desirable form, the zipper 24 comprises complementary zipper strips 25 and 27 wherein each of the strips has a plurality of hook shaped ribs 28 which are releasibly interlocked with one another within complementary grooves 29. Each of the zipper strips 25 and 27 has along one longitudinal side a lateral base continuation in the form of a flange 30 which is of sufficient original width, as indicated in dash outline, to be folded upon itself to provide along the length of the zipper strip and flat socket 31 receptive of the respective associated bag wall web margin 22a. If preferred, the flanges 30 may be initially formed in the folded fashion to provide the sockets 31. In either event, the reentrant groove or socket 31 in each instance will not only receive the web margins 22a but provide with those margins multi-layer rugged pull flanges for the associated bag for pulling the zipper 24 open when desired. This is an especially desirable structure where the bag wall web is of a material such as polyproplyene or the like of very thin section which might in and of itself be of insufficient form retention to provide satisfactory pull flanges. Such a condition may be encountered where it is desired to have the bag body web of a thin plastic such as polypropylene, while the zipper strips 25 and 27 are extruded from polyethylene.

Figure 4:
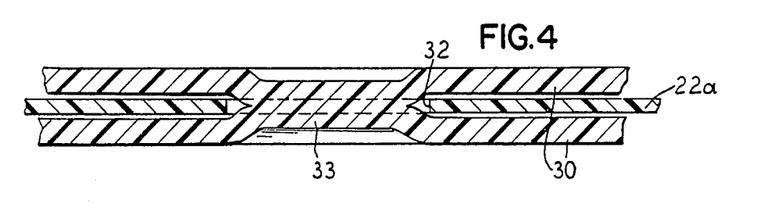
FIG. 4 is an enlarged fragmentary sectional detail view taken substantially along the line IV—IV in FIG. 1.

These materials are relatively fusibly incompatible, at least in a practical sense in the plastic bag art. While the zipper flanges 30 may be adhesively secured to the bag wall web margins, such securement presents problems as has been previously discussed. According to the present invention, all of the advantages of bags provided with pull flanges, and in particular multi-layer pull flanges is attained by providing the web margins 22a with perforations 32 at suitable intervals along the length of the margins received within the sockets 31, and heat sealing the turned flanges 30 to themselves through the perforations 32 as shown at 33. This provides solid connecting anchors at 33 which permanently secure the zipper strips to the bag wall web. By having the apertures 32 elongated in the direction of the length of the zipper strips, the anchors 33 can be likewise elongated in that direction. Thereby, advantageous shear strength is provided for resisting outward pulling forces applied to the web margins 22a within the multi-layer pull flanges when manipulating the same for pulling the zipper 24 open. It will be observed that the zipper profiles 28, 29 are located substantially below the upper ends of the pull flanges, so that ample width of the pull flanges extends upwardly, that is toward the top end, of the bag to facilitate grasping of the pull flanges when desired.

For reclosing the zipper after it has been opened, it is merely necessary to apply pressure to the profile areas of the zipper strips through the bag walls 21 and thereby press the zipper profiles into interlocking relation. As is known, with this kind of zipper in which the zipper strips are extruded plastic members, the profiles are resiliently flexibly enterengagable and separable. By having the zipper strips 25 and 27 unattached to the bag walls 21, except at the anchors 33, the bag walls 21 are adapted to expand away from the closed zipper 24 under the influence of normal internal pressures, so that the zipper will not be pulled open by reason of those internal pressures.

Figures 2, 3:
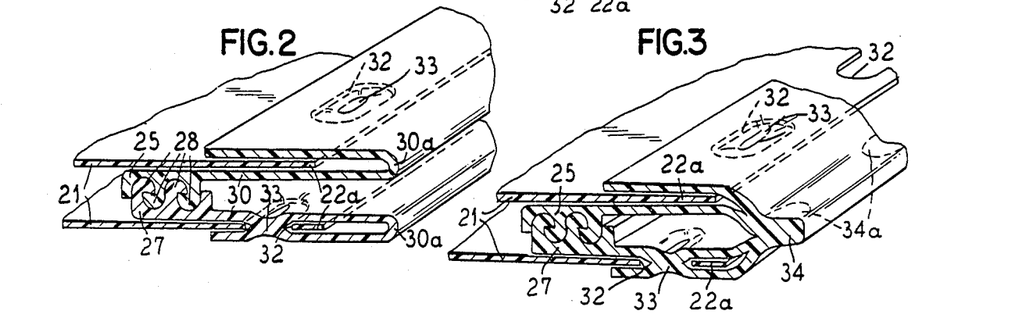
FIG. 2 is a fragmentary view similar to FIG. 1 but showing a slight modification.
FIG. 3 is a view similar to FIG. 2 but showing another slight modification.
Figures 2A, 6, 7, 8, 9, 10, 11:
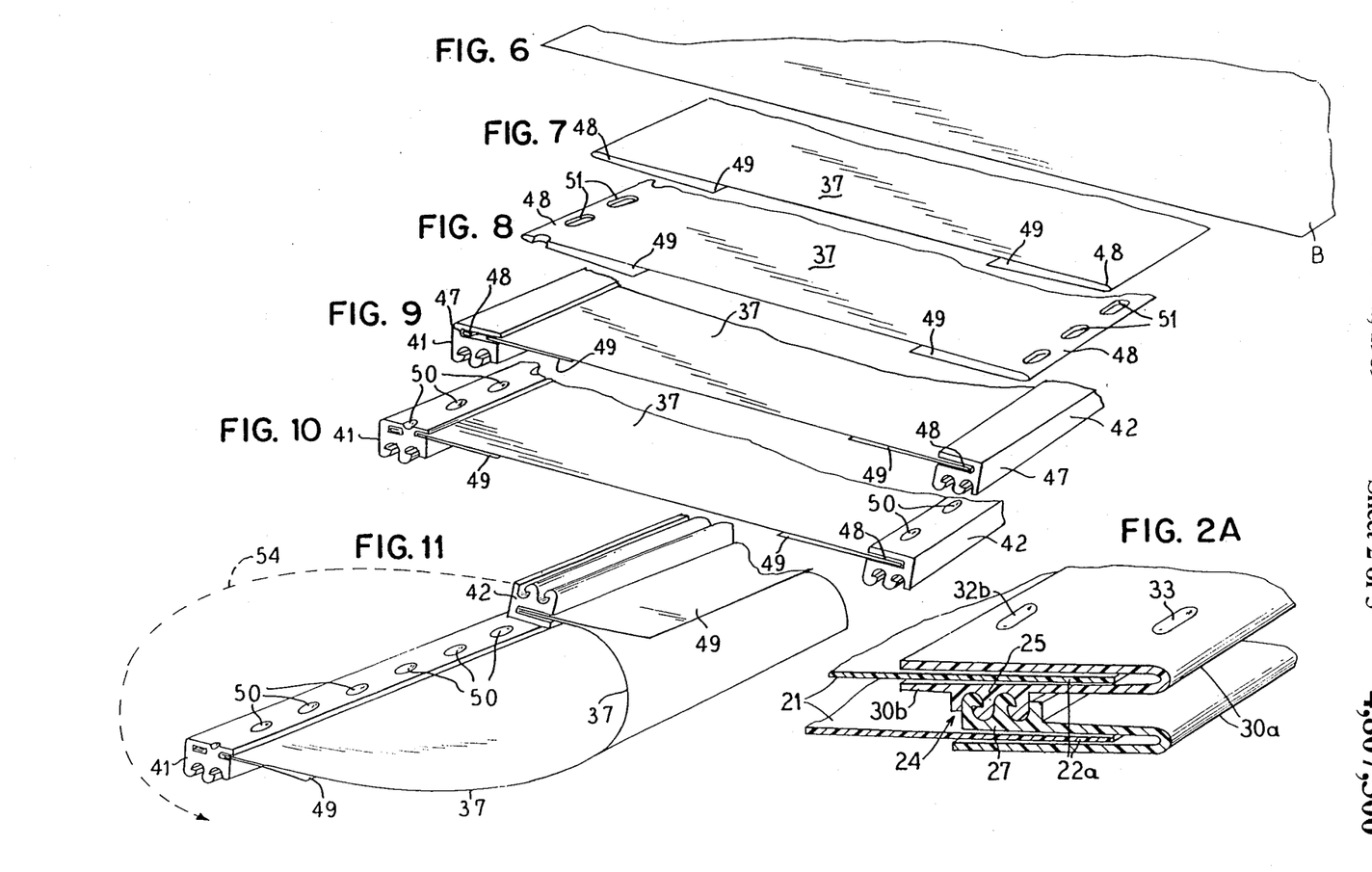
FIG. 2A is a modification of FIG. 2.
FIGS. 6–15, inclusive are fragmentary perspective, more or less schematic views showing how assembly and manipulation of the bag wall web and the fastener strips for the zipper are assembled and manipulated to arrive at the structure exemplified in FIG. 5.

However, if it is desirable for the bag to resist over and above normal internal opening pressures, the zipper section 25 is provided, as shown in FIG. 2A, with a flange 30 on the otherside of the zipper profiles which extends in a direction opposite to that of flange 30 before said flange was bent over and with a continuation of the bent over zipper flange 30. In addition the web margins are provided with a second set of perforations 32b so that the flange 30 can be heat sealed to the continuation of the folded zipper flange 30 through perforations 32b at the same time that the zipper flange 30 is sealed to itself through the perforations 32.

If it is desired to provide the zipper 24 with pilferproof means, that is with a means that will retain the bag 20 closed until it is legitimately opened, the arrangement depicted in FIGS. 2 and 3 may be employed. Here the various components may be substantially the same as in the structure of FIG. 1. except for the pilferproof feature, and therefore without going into a repetition of the description, identical reference numerals in FIGS. 2 and 3 will be understood to relate to the same description of the identically enumerated elements of FIG. 1. In FIGS. 2 and 3, the lateral flange extension 30 are formed longer than the flange extensions 30 in FIG. 1 so that upon doubling the flange extensions 30 upon themselves for the same purpose and to the same effect as in FIG. 1, fold projections 30a are formed which extend substantially beyond the tips of the bag wall margins 22. This provides extensions of the pull flanges 22a. Then, by fusibly sealing the folds 30a together, a pilferproof top seal 34 is produced. The pilferproof seal may either extend continuously along the length of the zipper 24, or may take the form of spot seals 34a at desirable intervals along the zipper length. In either event, in order to open the bag, it will be necessary to snip off or rip open the pilfer proof seal, or tear it along a line of weakened tear resistance, that is, destroy this seal.

While the constructions shown in FIGS. 1-4 do not provide a complete barrier bag, that is, a bag which is thoroughly sealed against leakage of fluid, vapor or gas, where that is consideration, the bag construction 35 disclosed in FIG. 5-15 meets that requirement. In the bag 35, thin bag wall web 37 is folded upon itself to provide a closed bottom 38 and an openable top 39 reclosable by means of a zipper 40. In this instance, the zipper 40 comprises a zipper strip 41 which is complementary to a zipper strip 42, both of the zipper strips comprising extruded plastic sections having interlockable complementary transversely hook shaped profiles 43 and corresponding grooves 44. Each of the zipper strips 41 and 42 has a return bent or directed base flange 45 projecting toward the outer end of the bag and providing an outwardly opening slot-like socket groove 47 extending along the zipper strip. Within the socket groove 47, in each instance, is received in a tucked in fashion a fold 48 along the outer marginal portion of the associated bag body wall 37. Each of the tucked in folds 48 comprises an outwardly extending pull flange terminal extension 49. The base flange 45 lies along the inside of the bag wall 37 in each instance.

Figure 5:
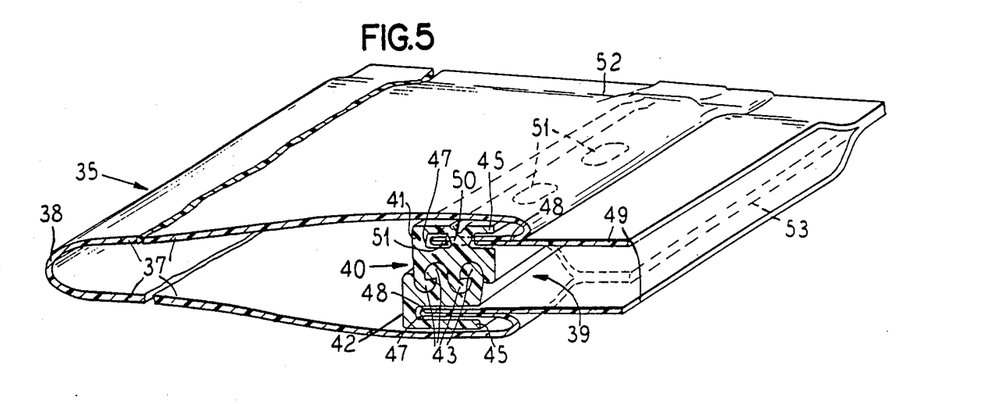
FIG. 5 is a fragmental perspective view showing a further modification.

Fixed, anchored attachment of the respective folds 48 within the socket grooves 47 is effected by fused connecting anchors 50 of the zipper strips extending through holes 51 formed in the folds 48 at suitable intervals along their length. The anchors 50 are formed by fusing the zipper flanges 45 to the opposed zipper strip body bases through the openings 51.

Complete barrier sealing of the bag 35 is effected, by not only the cross-sealing of the opposite sides of the bag as shown at 52, but also by the outer edge portions of the pull flanges 49 being sealed together as shown at 53. While the zipper 40 and the bag body material may not be fusibly compatible, the parts of the zipper strips 41 and 42 are fusibly compatible with one another, and the material of the bag walls 37 is fusibly compatible with itself, so that the seals 52 and 53 thoroughly seal the sides and top of the bag while the bottom of the bag is, of course, thoroughly sealed by being simply the fold 38. In this fashion the zipper, which may not of itself be impervious to gas or vapor is completely encompassed by the bag body walls. In addition, of course, the top seal 53 serves as a pilfer proof structure which must be destroyed to gain access into the bag through the top 39.

A series of steps in a method of making the bag 35 are exemplified in FIGS. 6-15. A continuous web of bag body film B (FIG. 6) is advanced step-by-step through the forming process, being first folded over along its side margins as shown in FIG. 7 to provide the folds 48. Then (FIG. 8), the folds 48 are punched to provide the series of spaced anchor holes 51 which, as shown are longitudinal elongated. Thereafter (FIG. 9), the zipper strips 41 and 42, as supplied in continuous strip form, are assembled so that the folds 48 are received with in the groove sockets 47, then the anchors 50 fused through the openings 51 (FIG. 10) to anchor the bag body material and the zipper strips to one another.

Figures 12, 13, 14, 15:
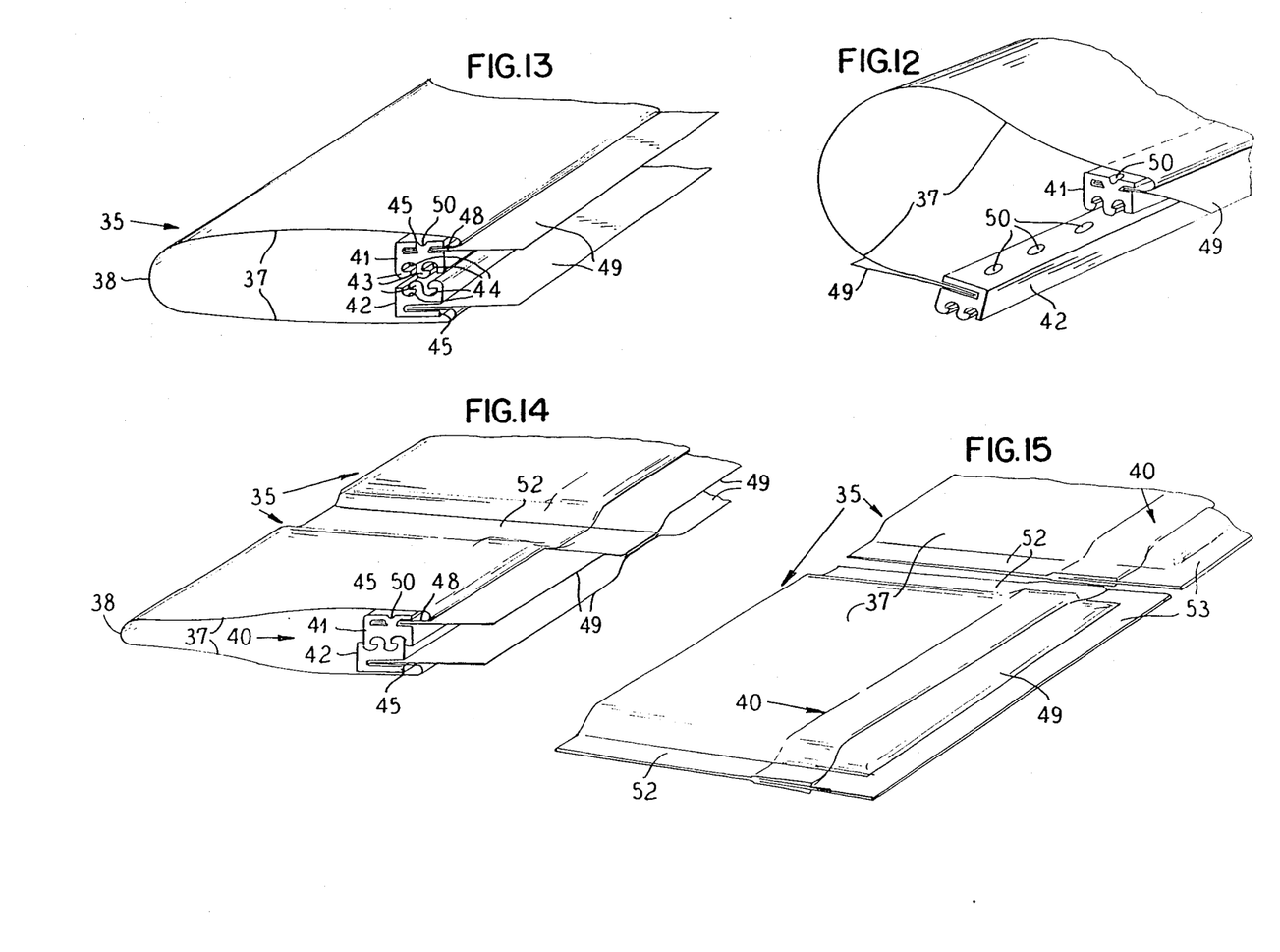

The assembly of bag body material 37 and zipper strips 41, 42 is then ready to be manipulated from the laid out or transversely flat production arrangement into the folded up bag formation as depicted in FIGS. 11-13. This may be effected, as shown, by swinging the side to which the zipper 42 is attached into complementary position relative to the side to which the zipper 41 is attached as indicated by the dashed arrow 54 in FIG. 11. Thereby, the bag wall 37 attached to the zipper strip 41 is pulled back over this zipper strip leaving the associated pull flange 49 projecting away from the zipper strip 41, as shown in FIG. 12. Then the zipper strip 42 is turned about its axis from the position shown in FIG. 12 into the position shown in FIG. 13 into complementary opposition to the zipper strip 41 as also shown in FIG. 13. This turns the pull flange 49 attached to the zipper strip 42 outwardly into opposing relation to the pull flange attached to the zipper strip 41, again as shown in FIG. 13. Thereafter, the zipper strips 41 and 42 may be interlocked to close the zipper 40 (FIG. 14) and the up to this point continuous ribbon of bag material may then be cross-sealed at successive bag section intervals by means of the cross seals 52.

Generally, when reaching the stage in manufacture as depicted in FIG. 14, the series of bags 35 will be either stored for future use, or sent on directly to a filling station where the ribbon of bag sections will be located sequentially under a bag filling device such as a nozzle, the zipper 40 opened, the bag filled, and the zipper closed. Then (FIG. 15) the top seal 53 may be completed along the upper end portions of the pull flanges 49. At this time, also, the respective filled bags 35 may be separated from one another by severing along or otherwise separating the side seals 52, by which the bag sections up to that time have been connected together. Alternately the continuous ribbon of bag material may be sent to a form fill and seal machine, where the bag manufacture and filling of same are carried out in a series of sequential operations.

For some purposes, it may be desirable, or at least more convenient, to provide bags from material on which a zipper 55 (FIGS. 16 and 17) is located on the outside of the bag instead of on the conventional inside of the bag. To this end, material is provided which comprises a folded web body 57 which may be formed from any suitable sheet or film material, and where made from plastic may be polypropylene. The bag body material as folded provides side walls 58 connected together by means of a bottom fold 59 and having upper (considered in relation to the top end of bags to be made therefrom) confronting margins 60 that may serve as pull flanges in the completed bags.

Figure 16:
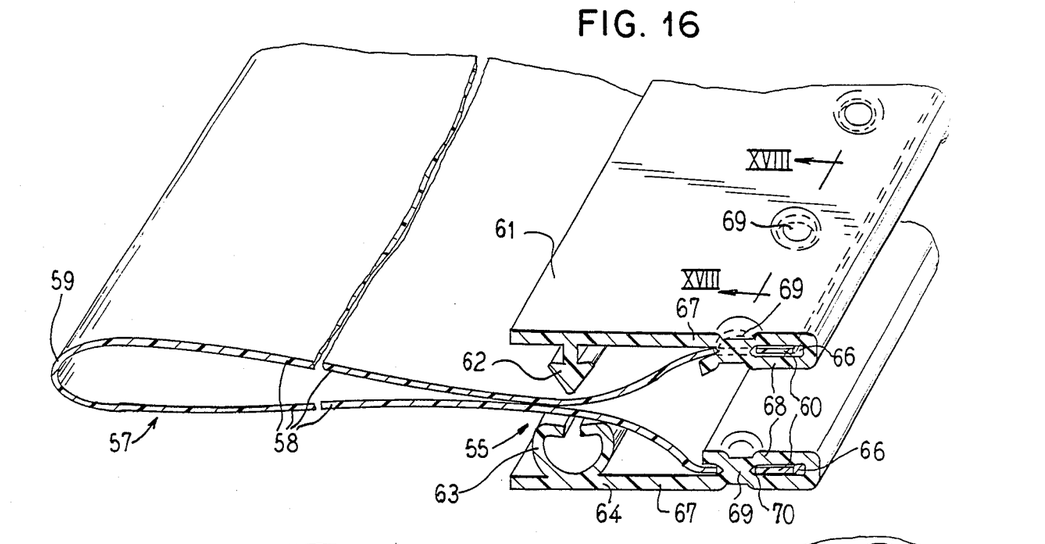
FIG. 16 is a fragmental perspective view showing still another modification.
Figure 17:
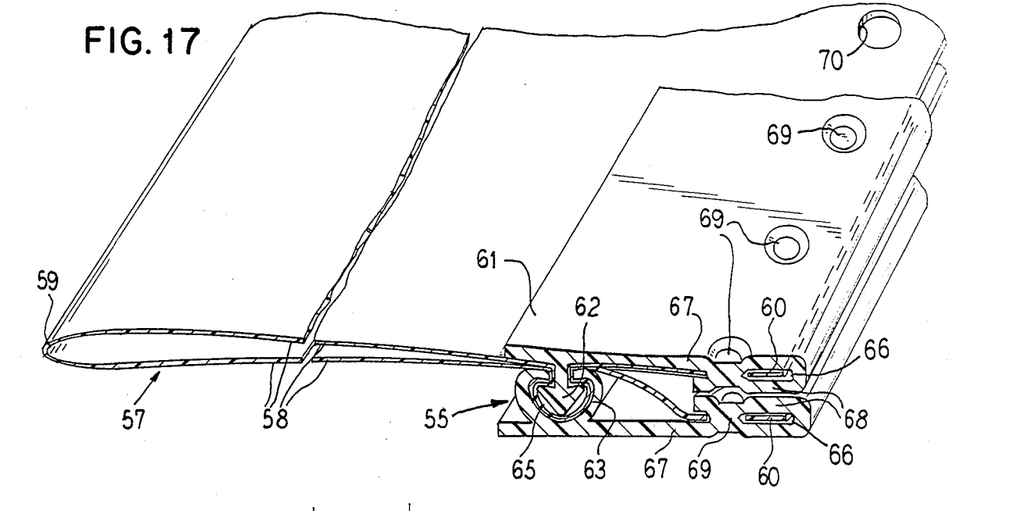
FIG. 17 is a view similar to FIG. 16 but showing the zipper closed for closing the top of the bag.

In this instance, the zipper 55 is so constructed and arranged that it will grip the upper end portions of the bag walls 58 therebetween when the zipper is closed. To this end, the zipper 55 comprises an extruded zipper strip 61 having a generally arrowhead shape cross section profile rib 62 which is receivable interlockingly in a generally C-shaped cross section grooved zipper profile 63 on a zipper strip 64 similar to the strip 61. The zipper profiles 62 and 63 are interlockably engagable by pressing the strips 61 and 64 toward one another by digital pressure applied in line with the aligned profiles 62 and 63 so that as best seen in FIG. 17, a tuck 65 of the walls 58 is locked into the closed zipper 65 and thereby closes the top of any bag made from the disclosed combination. Opening of the top to release the tuck 65 can be readily accomplished by pulling the pull flanges 60 apart.

Substantial reinforcement is provided for the bag wall pull flanges 60 by attaching thereto respective pull flange extensions 67 of the zipper strips 61 and 64. Where the zipper strips 61 and 64 are formed as polyethylene plastic extrusions, for example, and thus fusibly incompatible with the material of the bag wall panels 58, the flange extensions 67 are provided with return bent or directed respective terminal flanges 68 on the sides of the zipper strips which have the respective profiles 62 and 63. The terminal flanges 68 provide with the adjacent portions of the flange extension 67 respective flat sockets 66 receptive of the pull flange portions 60 of the wall panels 58. Thus, in the zipper and wall panel assembly, the terminal flanges lie at the inner sides or faces of the wall panels and more particularly the portions 60 thereof.

In order to permanently secure the zipper strips 61 and 64 to the respective wall portions 60, the terminal flanges 68 are fusibly secured to opposing areas of the flange extensions 67 to provide anchors 69 which extend through spaced anchor holes 70 in the wall portions 60. There may be as many of the anchors 69 as desired considering the size of the bags to be formed from the material, the bag loads to be accommodated and any other considerations which may influence the size, number and spacing of the anchors 69.

Figure 18:
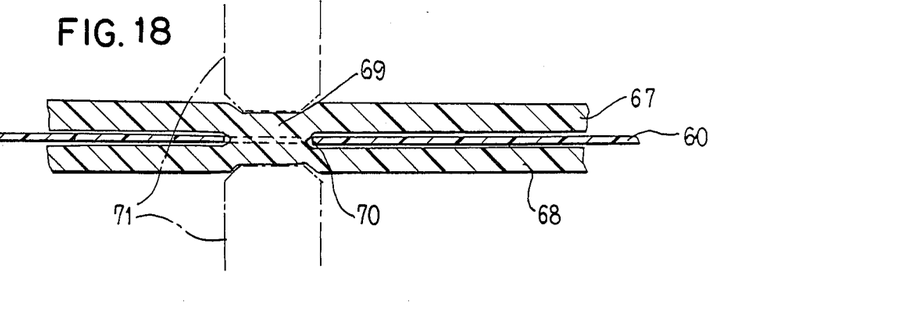
FIG. 18 is a schematic enlarged fragmentary sectional detail view taken substantially along the line XVIII—XVIII in FIG. 16.

Fusing of the anchors 69 through the anchor holes 70 may be effected in any desirable manner such as by means of plastic welding heads 71, schematically shown in FIG. 18. It will be appreciated that attachment of the zipper strips 61 and 64 to the bag wall portions 60 may be effected while the bag wall material is laid out flat or is advanced through a working station flat and the zipper strips 61 and 64 assembled therewith. Such assembly may be effected by wrapping the flange extensions 67 of the zipper strips about the edges the bag wall pull flange portions 60, or by receiving the wall portions into the sockets 69 preformed on these zipper strips.

Figure 19:
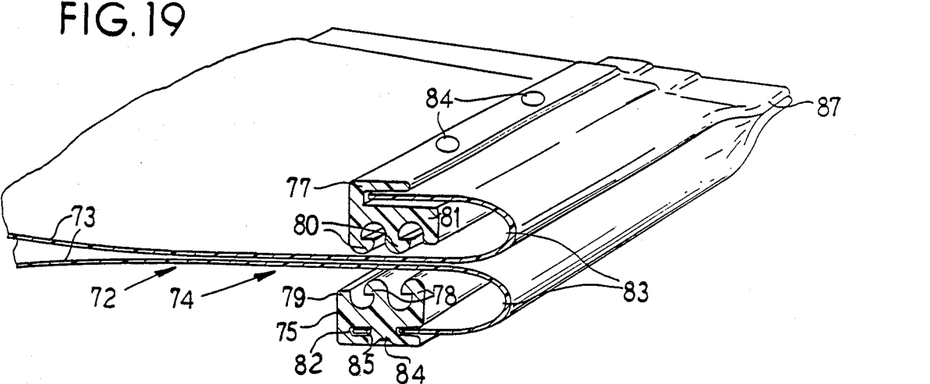
FIG. 19 is a fragmentary perspective view showing yet another modification which is similar to FIGS. 16 and 17, but utilizes a zipper structure similar to the zipper structure in FIG. 5.

In FIG. 19, a sheet or film web bag body 72 comprises material such as polypropylene providing opposite bag walls 73 which may be connected together by a fold or by a heat sealed seam at the bottom end of the bag, and by heat sealed seams along the sides of the bag, with an openable top closable by means of a zipper 74. This zipper 74 is assembled with the bag body in a manner to permit gripping of the upper end portions of the bag walls 73 in and between complementary extruded plastic zipper strips 75 and 77. In this instance, the zipper strip 75 has a plurality of generally hook-shaped resilient rib profiles 78 and a retainer rib profile 79 complementary to, and defining grooves receptive of similar resilient rib profiles 80 and a cooperative retainer rib profile 81 of the zipper strip 77. The profiles of the zipper strips are interlockable by pressing the zipper strips toward one another, and the profiles are resiliently releasable by pulling the zipper strips apart.

For attachment of the zipper strips 75 and 77 to the respective bag wall panels 73, each of the zipper strips has a flat socket 82 in its base portion and with the socket opening in the direction of the openable top of the bag. The upper portions of the wall panels 73 lie between the cooperatively aligned zipper strips 75 and 77. Pull flange terminal portions 83 of the wall panels are return bent and with their terminal ends received in their respective sockets 82. Permanent securement of the zipper strips to the pull flange terminal portions 83 is effected by spot heat sealed fused anchors 84 extending integrally across the sockets 82 and through holes 85 in the terminal portions 83. It will be understood that there will be as many of the fused anchors 84 and corresponding anchor holes 85 along the length of the zipper 74 as may be deemed desireable considering the width of the particular bag having this bag wall and zipper assembly. In a preferred arrangement, the opposite sides of the bag are closed by heat sealed seams 87, with the respective ends of the zipper strips 75 and 77 sealed in the seams 87. As shown, the turned pull flange portions 83 extend a sufficient distance beyond the zipper 74 to afford ample digital gripping area for pulling the zipper open from a closed condition wherein the portions of the bag walls 73 intervening between these zipper strips 75 and 77 are interlocked with the zipper profiles, substantially in the manner exemplified in FIG. 17.

Figures 20, 21:
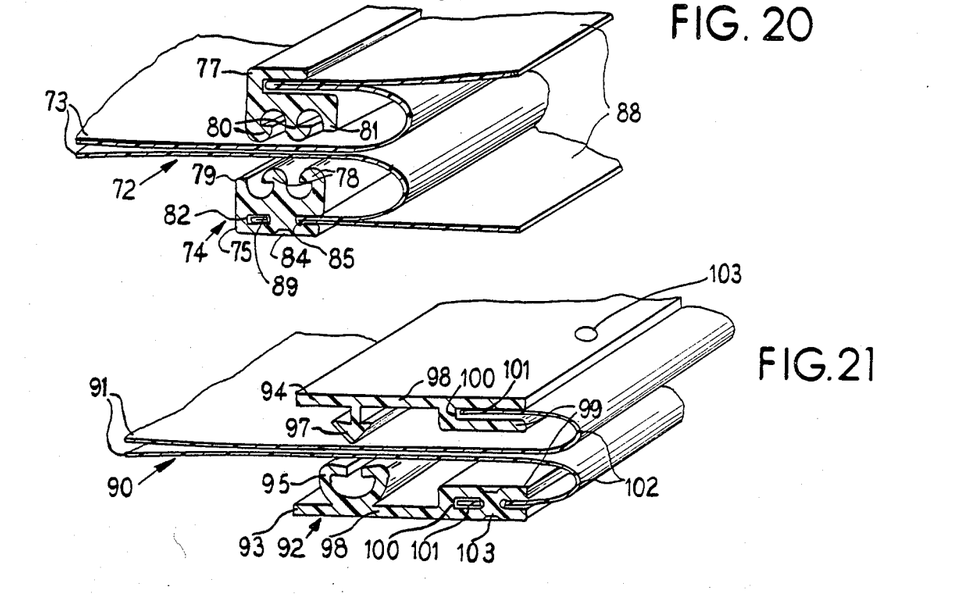
FIG. 20 is a fragmentary perspective view of a modification which is in most respects similar to FIG. 19 but with the pull flange portions of the bag walls in a modified orientation.
FIG. 21 is a fragmentary perspective view showing a modification utilizing a zipper similar to FIG. 16 but with a different socket arrangement for cooperation with the pull flange portions of the bag walls.

FIG. 20 discloses a construction similar to FIG. 19, except for the manner in which the pull flanges 88 are attached to the zipper. The details of structure are the same as in FIG. 19 and the same reference numerals are applied to corresponding elements which will be understood to involve the same description as given for those elements in FIG. 19. Thus, in FIG. 20, the bag walls 73 lie between the zipper strips of the zipper 74 to the same effect for tucked-in interlocked gripping by and between the profiles of the zipper strips 75 and 77. However, instead of the terminal portions of the pull flanges 88 being secured within the sockets 82, each of the wall panels 73 has a return bent fin-like fold 89 along the inner portion of each of the pull flanges 88, and the fold 89 has the anchor holes 85 through which the fused anchors 84 extend for securing the zipper strips and wall panels together. The pull flanges 88 extend to a desireable extent beyond the respective zipper strips and provide digital gripping areas for manipulating the pull flanges 88.

It will be understood that both as to the pull flanges 83 in FIG. 19 and the pull flanges 88 in FIG. 20, if desired, tamper evident sealed securement of the pull flanges may be effected similarly as disclosed in connection with FIGS. 3 and 5.

Referring now to FIG. 21, a bag construction 90 is depicted having a body formed from sheet or film material providing bag side wall panels 91 and having the upper end portion of the bag attached to a reclosable fastener or zipper 92 comprising opposed, complementary extruded plastic zipper strips 93 and 94. Although the material of the bag body wall panels 91 may be fusibly attachable to itself, such as polypropylene, the zipper strips 93 and 94 are preferably formed from polyethylene which is readably fusible to itself but which is not fusible to the polypropylene bag wall material. The zipper strips 93 and 94 may have complementary interlockable profiles similar to the zipper strips in FIGS. 19 and 20, but are shown as having profiles similar to the profiles of the zipper strips in FIGS. 16 and 17. That is, each of the zipper strips 93 and 94 has a relatively flat base and one of the strips, herein strip 93, has a generally grove shaped profile 95 adapted to receive separably interlockably a generally arrowhead shaped rib profile 97 of the zipper strip 94.

For connection to the upper end portions of the bag wall panels 91, the zipper strips 93 and 94 have, in mirror image relation, on upwardly projecting flange extension 98 thereof socket flange structures 99, each of which has a flat socket 100 wherein a return directed terminal end portion 101 of a pull flange portion 102 of the associated bag wall panel 91 is received. Anchorage of the terminal portions 101 is effected by means of fused anchors 103 extending across the sockets 100 and extending through respective holes 104 in the terminal portions 101.

Figure 22:
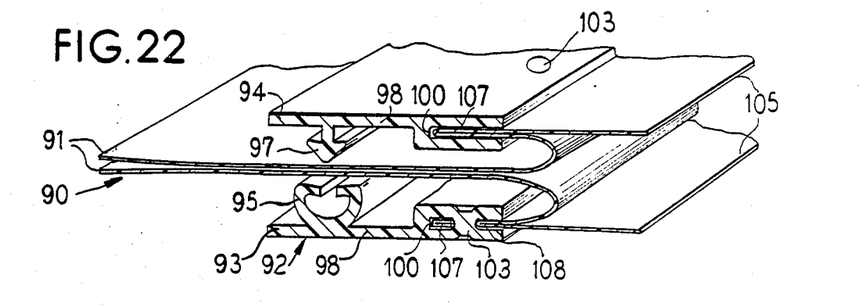
FIG. 22 is a fragmentary perspective view of a modification similar to FIG. 21 but showing a slightly different manner of engaging the pull flange portions of the bag wall panels within the anchoring sockets of the zipper strips.

In FIG. 22, the bag structure 90 is substantially the same as in FIG. 21 and similar reference characters indicate similar parts and the same description applies thereto as in FIG. 21. The difference in FIG. 22 resides in that the attachment of the wall panels 91 to the zipper strips 93 and 94 is similar to the arrangement shown in FIG. 20. That is, the outer end portions of the panels 91 serve as pull flanges 105 with return bent anchorage folds 107 tucked into the sockets 100. Securement of the anchorage folds 107 within the sockets 100 is by means of the fused anchors 103 extending through anchor holes 108 in the anchor folds. The pull flange portions 105 extend far enough out from the sockets 100 to provide adequate digital gripping area for pulling the zipper open from a closed condition wherein the areas of the wall panels 91 between the zipper strips 93 and 94 are gripped by and between the interlocked profiles 95 and 94 in a bag closing relation, similarly as demonstrated in FIG. 17.

It will be appreciated that the pull flange portions 102 in FIG. 21 and the pull flange portions 105 in FIG. 22 may be of sufficient extent to permit tamper evident securement similarly as described for the pull flanges in FIGS. 3 and 5, if desired.

The structure of FIGS. 16 to 22 is readily adaptable to manual or machine filling and closing, and the bags made from the material are easily opened by pulling on the respective pull flange assemblies. The bags can be readily closed by pushing the zippers together into interlocked, relation with the bag wall material tucked into and locked in the zipper profiles.

It will be understood that variations and modifications may be effected without departing from the spirit and scope of the novel concepts of the present invention.

We claim:

1. A bag structure having a thin web body providing an openable top portion flanked by opposed upwardly projecting pull flanges, and an extruded plastic zipper means carried by said body along said pull flanges, and comprising:
    said body and said zipper means being fusibly incompatible;
    said zipper means comprising a pair of extruded plastic strips having complementary separably interlockable zipper profiles located substantially below upper ends of said pull flanges;
    said plastic zipper strips having sockets extending therealong and material of said body received in said sockets;
    said material received in said sockets having anchor holes therethrough at predetermined intervals along the sockets;
    anchors extending from said zipper strips into said anchor holes and thereby permanently securing said zipper strips to said body; and
    a pilfer evident seal extending along said pull flanges and required to be destructively opened to gain access into said openable top which is thereafter reclosable by said zipper means.

2. A bag structure according to claim 1, wherein said pilfer evident seal comprises said pull flanges secured together.

3. A bag structure according to claim 2, wherein at least one of said pull flanges comprises in part a fold tucked into a socket extending along at least one of said zipper strips.

4. A bag structure according to claim 3, wherein said socket extends along a base of said one zipper strip, said socket opening in the direction of opening of the openable top, said one pull flange extending outwardly from said socket, said fold having said anchor openings, and said anchors extending across said socket through said openings.

5. A bag structure according to claim 1, wherein said zipper strips have flange extensions with return turned terminals defining said sockets, and said flange extensions having fold portions extending beyond tips of said pull flanges and secured together for providing said pilferproof seal.

6. A bag structure having a thin web material body having wall panels providing an openable top portion flanked by opposed upwardly projecting pull flange portions, and extruded plastic zipper means carried by said body along said pull flange portions, and comprising:
    said body and said zipper means being fusibly incompatible;
    said zipper means comprising a pair of extruded plastic strips having complementary separably interlockable zipper profiles located substantially below upper ends of said pull flange portions;
    said plastic zipper strips having base socket parts providing respective sockets extending therealong and said pull flange portions having anchorage structures received in said sockets;
    said anchorage structures having anchor holes therethrough at predetermined intervals along the sockets;
    anchors extending from said zipper socket parts into said anchor holes and thereby permanently securing said zipper strips to said pull flange portions; and
    said pull flange portions in each instance extending substantially beyond said socket parts or said socket parts extending substantially beyond said flange portions and thereby providing digital grasping areas of a length adapted for providing a pilfer evident seal when sealed together.

7. A bag structure according to claim 6, wherein said anchorage structures comprise folds extending along the lower ends of said pull flange portions, and said zipper strip sockets opening upwardly from a lower side of each of said zipper strips, said folds being received in said sockets and permanently secured therein by said anchors.

8. A bag structure according to claim 6, wherein said socket parts project beyond the associated pull flange portions, and said socket parts having return directed terminals located at the inner sides of the associated pull flange portions.

9. A bag structure according to claim 8, wherein said zipper strips are located long the outer faces of said bag wall panels and have complementary reclosable profiles for locking an area of said bag wall panels within the interlocked profiles.

10. A bag structure according to claim 6, wherein said zipper strips are located along the outer faces of said bag wall panels and have complementary recloseable profiles for locking an area of the bag wall panels within the interlocked profiles.

11. A bag according to claim 10, wherein said flange portions have said anchorage structures in the form of terminal ends of said flange portions received in said sockets.

12. A bag structure according to claim 10, wherein said anchorage structures comprise folds of said flange portions received in said sockets.

13. A bag structure according to claim 10, wherein said sockets open upwardly, and said flange portions are turned downwardly and the ends of said flange portions serve as said anchorage structures.

14. A bag structure according to claim 10, wherein said sockets open downwardly, and said anchorage structures of said pull flange portions extend upwardly into said sockets.

15. A bag structure according to claim 10, wherein said base socket parts of one of said strips are in confronting relation to the other of said strips.

16. A bag structure according to claim 10, wherein said base socket parts are on sides of said zipper strips which face away from one another.

17. A method of making a bag structure having a thin body providing an openable top portion flanked by opposed upwardly projecting pull flanges, and an extruded plastic zipper means carried by said body along said pull flanges, and comprising:

forming said body from one selected material and said zipper means from extruded plastic material which is fusibly incompatible with the material of said body;

providing said zipper means as a pair of strips having complementary separably interlockable profiles located substantially below upper ends of said pull flanges;

forming said zipper strips with sockets extending therealong;

receiving material of said body in said sockets with anchor holes at predetermine intervals therealong;

forming anchors extending from said zipper strips into said anchor holes and thereby permanently securing said zipper strips to said body; and forming a pilfer evident seal extending along the pull flanges and required to be destructively opened to gain access into said openable top which is thereafter reclosable by said zipper means.

18. A method according to claim 17, which comprises securing said pull flanges together to provide said pilfer evident seal.

19. A method according to claim 18 which comprises forming at least one of said pull flanges with a fold tucked into a socket extending along at least one of said zipper strips.

20. A method according to claim 19, comprising forming said socket to extend along a base of said one zipper strip and opening in the direction of opening of the openable top, effecting extension of said one pull flange outwardly from said socket, and providing said anchor openings in said fold, and effecting extension of said anchors across said socket through said openings.

21. A method according to claim 17, comprising providing said zipper strips with flange extensions with turned terminals defining said sockets, and providing said flange extensions with fold portions extending beyond tips of said pull flanges and securing said fold portions together and thereby providing said pilferproof seal.

22. A method of making a bag structure having a thin web body with wall panels providing an openable top portion flanked by opposed upwardly projecting pull flange portions, and extruded plastic zipper means carried by said body along said pull flange portions, and comprising:

providing said body of one material and said zipper means from another material which is fusibly incompatible with the body material;

providing said zipper means as a pair of extruded plastic strips having complementary separably interlockable zipper profiles located substantially below upper ends of said pull flanges portions;

providing said plastic zipper strips with base socket parts defining respective sockets extending therealong and receiving anchorage structures of said pull flange portions in said sockets;

providing anchor holes in said anchorage structures at predetermined intervals along the sockets;

providing anchors extending from said zipper strip socket parts into said anchor holes and thereby permanently securing said zipper strips to said pull flange portions; and effecting extension of one of said pull flange portion or said socket part in each instance substantially beyond the other of said flange portion or said socket part and thereby providing digital grasping area of a length adapted for providing a pilfer evident seal when sealed together.

23. A method according to claim 22, comprising forming said anchorage structures to extend downwardly, forming said zipper strip sockets to open upwardly from said strips, receiving said anchorage structures in said sockets, and permanently securing the anchorage structure in said sockets by means of said anchors.

24. A method according to claim 22, which comprises projecting said anchorage structures beyond the associated pull flange portions, and providing said anchorage structure as return directed terminals extending along the inner side of the pull 25. A method according to claim 24, which comprises locating said zipper strips along the outer faces of the bag wall panels and with complementary interlockable reclosable profiles for locking an area of the bag wall panels between and within the interlocked profiles.

* * * * *